United States Patent
Corcione et al.

(10) Patent No.: US 6,997,164 B2
(45) Date of Patent: Feb. 14, 2006

(54) VIRTUAL PRESSURE SENSOR FOR A COMMON RAIL INJECTION SYSTEM

(75) Inventors: Giuseppe Esposito Corcione, Marigliano (IT); Mario Lavorgna, Bacoli (IT); Giuseppe Palma, Pozzuoli (IT); Olga Scognamiglio, Portici (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 10/722,069

(22) Filed: Nov. 25, 2003

(65) Prior Publication Data

US 2004/0154593 A1 Aug. 12, 2004

(30) Foreign Application Priority Data

Nov. 28, 2002 (EP) .................................. 02425733

(51) Int. Cl.
*F02D 41/00* (2006.01)

(52) U.S. Cl. ....................... 123/447; 123/456; 123/494

(58) Field of Classification Search ................ 123/494, 123/456, 447, 446, 436; 73/119 A, 117.1–117.3
See application file for complete search history.

(56) References Cited

U.S. PATENT DOCUMENTS 5,609,136 A * 3/1997 Tuken ......................... 123/357
6,085,727 A * 7/2000 Nakano ....................... 123/447
6,308,685 B1 10/2001 Becker ........................ 123/456
6,311,669 B1 11/2001 Przymusinski et al. ..... 123/300
6,484,696 B2 * 11/2002 Barnes et al. ............... 123/446

FOREIGN PATENT DOCUMENTS

| EP | 1 022 452 B1 | 10/2003 |
| FR | 2 803 875 A1 | 7/2001 |
| FR | 2 808 051 A1 | 10/2001 |

OTHER PUBLICATIONS

Yang, W.C. et al., "Dynamic Modeling and Analysis of Automotive Multi-Port Electronic Fuel Delivery System," *Journal of Dynamic Systems, Measurement and Control* 113:143-151, Mar. 1991.

* cited by examiner

*Primary Examiner*—Weilun Lo
(74) *Attorney, Agent, or Firm*—Lisa K. Jorgenson; E. Russell Tarleton; Seed IP Law Group PLLC (57) ABSTRACT

A Common Rail injection system of an endothermic engine, the injection system including at least one fuel pressure accumulating tank, of the rail type, having an input in fluid communication with a high-pressure pump and a plurality of outputs for feeding corresponding injectors by using pressure regulating means connected and depending on an electronic control unit. Advantageously a virtual pressure sensor includes a fluid-dynamic model of the accumulating tank suitable to estimate and to obtain fluid pressure values used by the electronic control unit for driving the injection means of the Common Rail injection system.

19 Claims, 8 Drawing Sheets

EU Emission Standards for Passenger Cars, g/km

| Tier | Year | CO | HC | HC+NOx | NOx | PM |
|---|---|---|---|---|---|---|
| Diesel | | | | | | |
| Euro 1 | 1992 | 2.72 | - | 0.97 | - | 0.14 |
| Euro 2 – IDI | 1996 | 1.0 | - | 0.7 | - | 0.08 |
| Euro 2 – DI | 1999 | 1.0 | | 0.9 | - | 0.10 |
| Euro 3 | 2000.01 | 0.64 | - | 0.56 | 0.50 | 0.05 |
| Euro 4 | 2005.01 | 0.50 | | 0.30 | 0.25 | 0.025 |
| Petrol (Gasoline) | | | | | | |
| Euro 3 | 2000.01 | 2.30 | 0.20 | - | 0.15 | - |
| Euro 4 | 2005.01 | 1.0 | 0.10 | - | 0.08 | - |

*FIG. 9*

VIRTUAL PRESSURE SENSOR FOR A COMMON RAIL INJECTION SYSTEM

BACKGROUND OF THE INVENTION

1. Field of the Invention

The present invention relates to a virtual pressure sensor, and more particularly but not limited to, to a virtual pressure sensor for a so-called Common Rail (CR) electronic injection system equipped in an endothermic engine, and the following description is made with reference to this field of application for convenience of illustration only.

2. Description of the Related Art

As it is well known, strict restrictions imposed on the exhaust emissions and the fuel consumption of IC (Internal Combustion) engines by the European Union within 2005, in combination with recent developments of injection systems, are focusing the efforts of the automotive industry on the optimization of the injection process in IC engines.

It should be remembered that in a so-called CR (Common Rail) injection system, unlike conventional injection systems, the fuel is stored under pressure within an accumulator called a rail. Such a Common Rail injection system (hereinafter CR system) is shown schematically in FIG. 1, globally indicated as 1.

Figure 1:
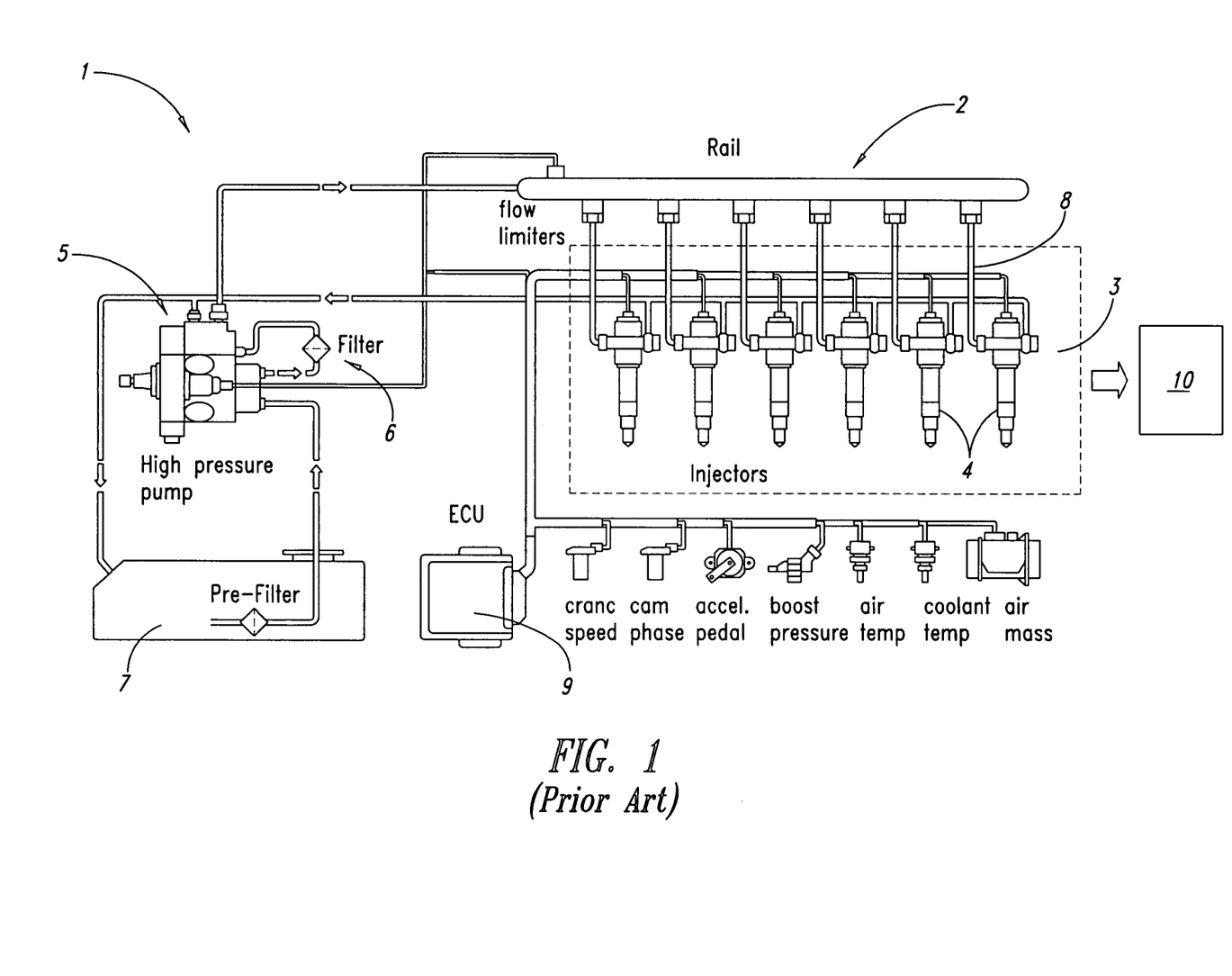
FIG. 1 shows schematically a CR (Common Rail) system according to the prior art.

The CR system 1 thus comprises an accumulating tank, called a rail 2, which is connected in turn to an injection block 3 that includes a plurality of injectors 4. The rail 2 is further connected to a high-pressure pump 5 provided with a filter 6 and a precleaner 7.

The use of a pressure regulator realized by means of an electro-mechanical member for regulating the fuel pressure inside the rail 2 is known.

In particular, the injectors 4 are connected to the rail 2 through small pipelines 8, and include essentially a fuel nozzle or atomizer and a solenoid valve. The solenoid valve is energized by an ECU (Electronic Control Unit), generally shown with 9, arranged to activate the injection of fuel into the engine 10. The injection stops as the solenoid valve is de-energized.

The amount of fuel injected, under constant pressure, normally increases with the solenoid valve opening time, and is therefore wholly independent from the speed either of the engine 10 or of the pump 5.

In currently available systems, the duration of the fuel injection is established according to the pressure inside the rail 2 and to the desired amount of fuel (Qfuel) to be injected into a combustion chamber of the engine 10 to fill a possible demand for torque at a certain rotation speed of the driving shaft of the rotor itself. This correlative function is called mapping, and it is tabularly described as follows:

The rail pressure shown in Table I (Column 4) is not an actual pressure, but the pressure set by of the electronic unit 9 obtained by setting a duty cycle value as shown in the third column of Table I.

Figure 2:
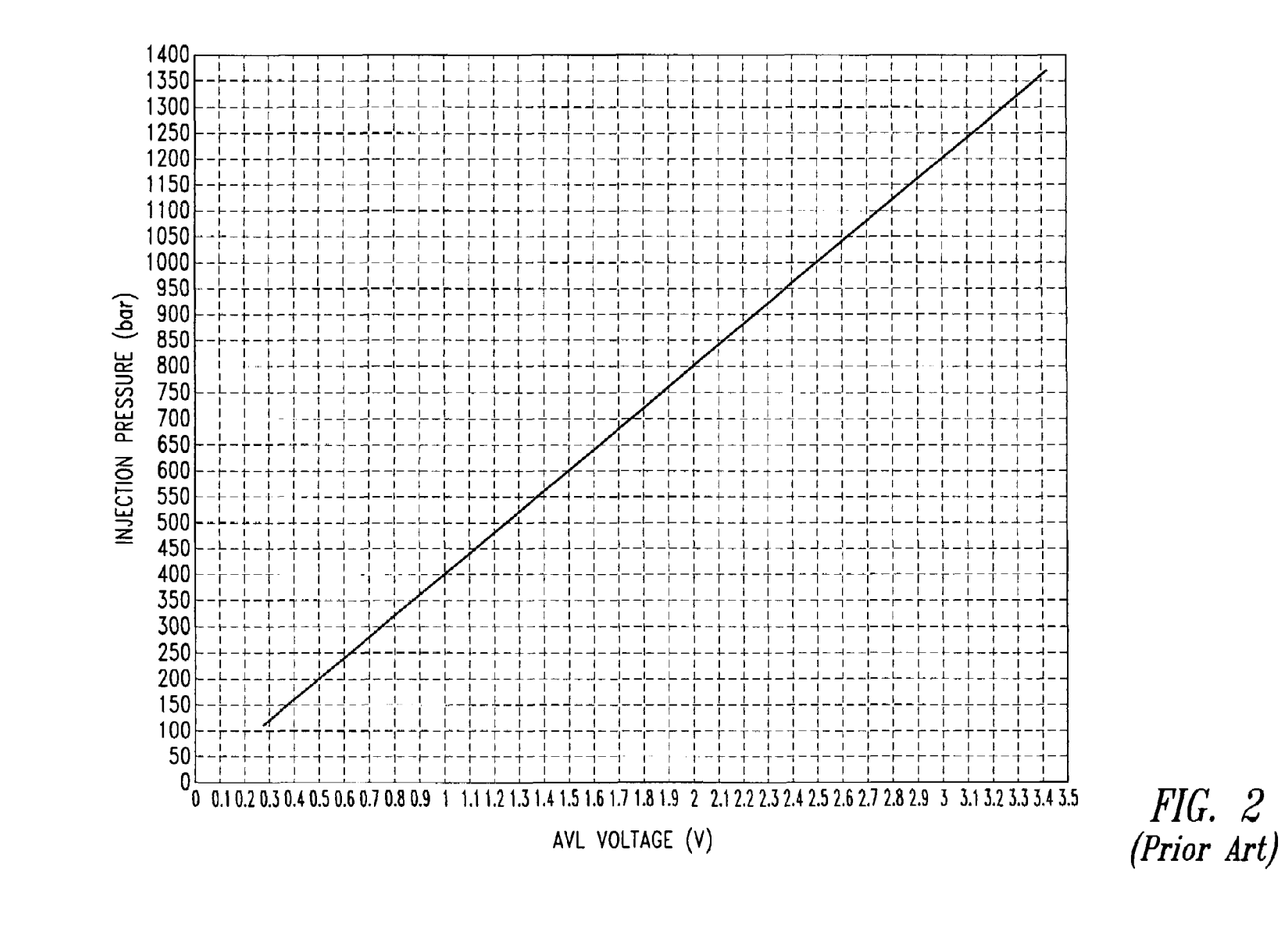
FIG. 2 shows schematically the patterns of pressure and duty cycle values of the system of FIG. 1.

In particular, the pressure set depends linearly on the duty cycle value, as shown in FIG. 2.

The CR system 1 just described has a serious drawback in the very fact of considering a non-actual rail pressure, but rather the pressure set by the electronic unit 9, which is a slowly varying signal representing an average pattern, not the actual one.

Figure 3:
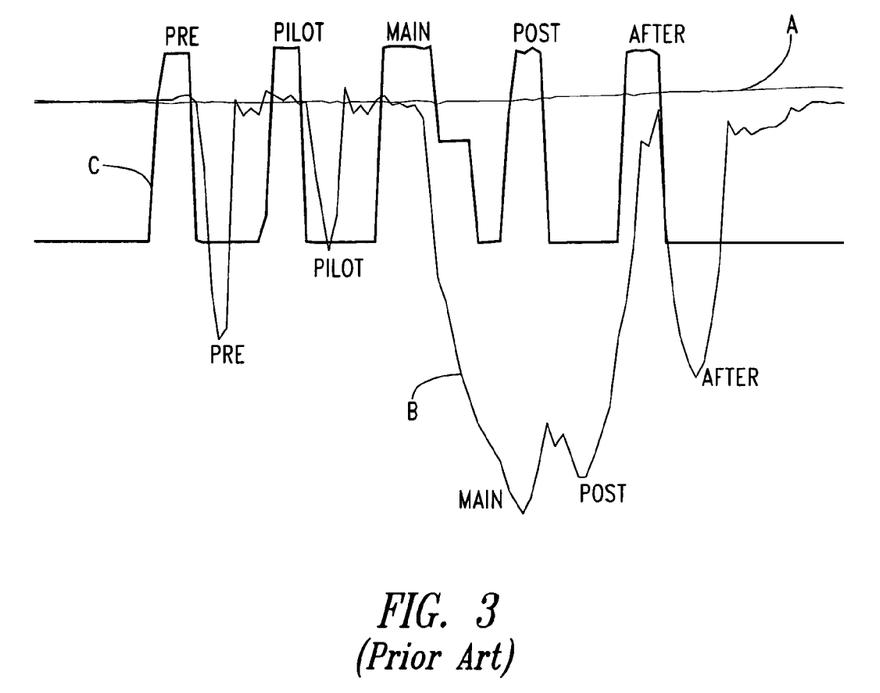
FIG. 3 shows schematically the pattern of signals relating to the system of FIG. 1.

The discordance between the pattern of the actual pressure value and that of the pressure set by the electronic unit 9 is revealed at once by suitably surveying the CR system 1 under normal conditions of operation of the engine 10, as shown schematically in FIG. 3, where the pattern of the pressure set in the rail (curve A) is significantly different from the actual pressure pattern (curve B).

This means that the duration of a single injection calculated according to the scheme of the CR system 1 will differ from that actually required for injecting the desired amount of fuel.

FIG. 3 also shows an injection profile, viz. the injector current law (curve C). It can be seen that the actual rail pressure signal inside the rail (curve B) undergoes fluctuations within a period of about 500 $\mu$s (microseconds), apparently related to single injections.

Such fluctuations, which may attain amplitudes of up to 120 bar, make current single-injection CR systems inaccurate, because the pressure is considered to be constant and equal to the value set by the regulator (curve A).

The above phenomenon is intensified in multiple injection systems, because the injections themselves are closer together within time.

The injection regulating accuracy provided by a preset constant pressure value is evidently low in latest generation multiple injection systems, and this is a limiting factor for optimum combustion, and accordingly, for top efficiency and minimized exhaust emissions.

It should be further noted that, through most of the main phase (MAIN) and throughout all the POST and AFTER phases, the actual pressure level is far different from the set level, viz. the level used for selecting the injection law. As a result, the amount of fuel injected into the chamber differs materially from the amount that has been planned in order to fill a certain demand for torque.

The underlying technical problem of this invention is to provide a pressure sensor for a so-called CR injection system with appropriate structural and functional features to optimize the amount of fuel injected into the engine at each injection, to reduce exhaust emissions, and to enhance the

TABLE I

| Speed Rotation (RPM) | Demanded torque (Nm) | Rail pressure regulator (duty %) | Rail pressure (bar) | Injection duration (us) | Demand Qfuel (mm$^3$) |
| --- | --- | --- | --- | --- | --- |
| 1000 | 120 | 31.8 | 620 | 790 | 24 |
| 1400 | 140 | 37.9 | 800 | 720 | 27 |
| 1800 | 180 | 50.8 | 1080 | 740 | 35.5 |
| 2200 | 260 | 68 | 1350 | 940 | 50.5 |
| 2600 | 220 | 68 | 1350 | 940 | 50.5 | efficiency of the endothermic engine associated with said injection system, thereby overcoming the drawbacks with which current injection systems are beset.

BRIEF SUMMARY OF THE INVENTION

The disclosed embodiments of the invention utilize, as the fuel injection control signal, a pressure signal that is neither preset nor obtained in the form of punctual data, but is instead provided on the basis of pressure values measured at different points along the rail, thereby optimizing the amount of fuel to be injected into the engine.

In accordance with one embodiment of the invention, a virtual pressure sensor for a common rail injection system of an endothermic engine is provided. The injection system comprises at least one fuel pressure accumulating tank of the rail type having an input in fluid communication with a high-pressure pump and a plurality of outputs for feeding corresponding injectors by using a pressure regulating device connected to and depending upon an electronic control unit, the pressure regulating device including a fluid-dynamic model of the accumulating tank to estimate and to obtain fluid pressure values used by the electronic control unit for driving the injection devices of the common rail injection system.

In accordance with another aspect of the foregoing embodiment, the fluid-dynamic model of the accumulating tank provides models of sections of the accumulating tank and sections corresponding to the injectors to enable the pressure value of each injector to be calculated dynamically while the endothermic engine is running.

In accordance with another aspect of the foregoing embodiment of the invention, the fluid dynamic model of the accumulating tank is schematized by a cascade of sub-systems in fluid communication with one another, each subsystem having a first input terminal and first output terminal, as well as a second input terminal (A) connected to the electronic unit (9) and a second output terminal (P) arranged to supply a pressure value.

In accordance with yet another aspect of the foregoing embodiment of the present invention, the electronic control unit is configured to supply an interfacing bus with a signal corresponding to a pressure set by the accumulating tank and an injection law, and it receives from it a signal corresponding to an estimation of the actual pressure in the accumulating tank at the injectors as estimated by the fluid-dynamic model.

BRIEF DESCRIPTION OF THE DRAWINGS

In the drawings:

FIG. 7 shows a model of the virtual pressure sensor according to the invention;

DETAILED DESCRIPTION OF THE INVENTION

Reference will be made hereinafter to a CR (Common Rail) injection system of conventional basic design. Elements already described in relation to the system of FIG. 1 will be indicated with the same numerical reference.

Figure 4A:
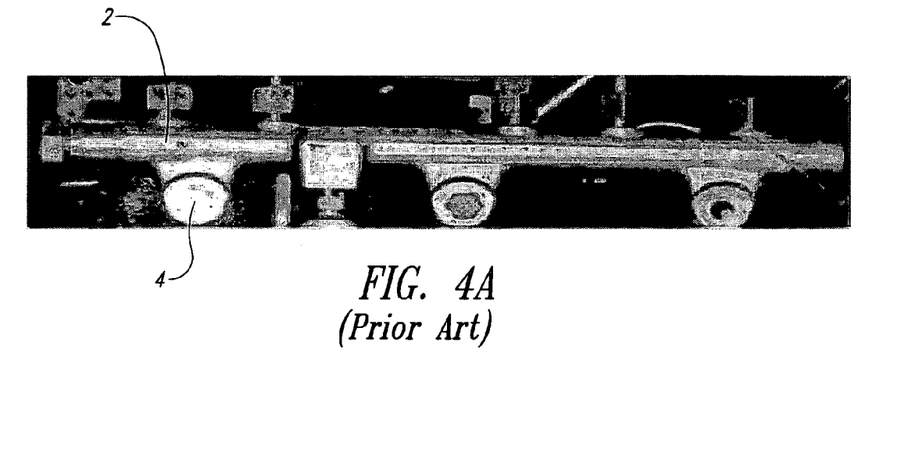
FIG. 4A shows schematically an embodiment of a CR injection system.
Figure 4B:
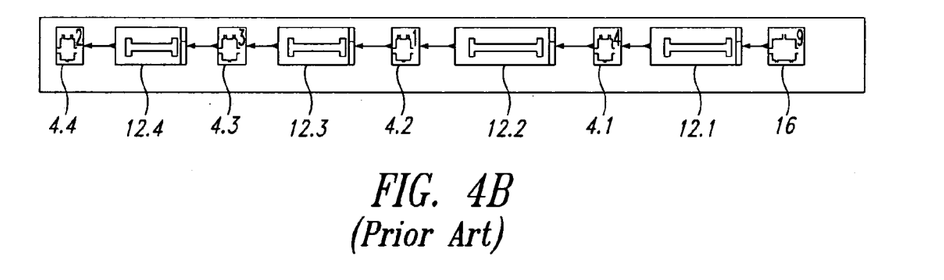
FIG. 4B shows schematically a model of the rail of FIG. 4A.
Figure 5:
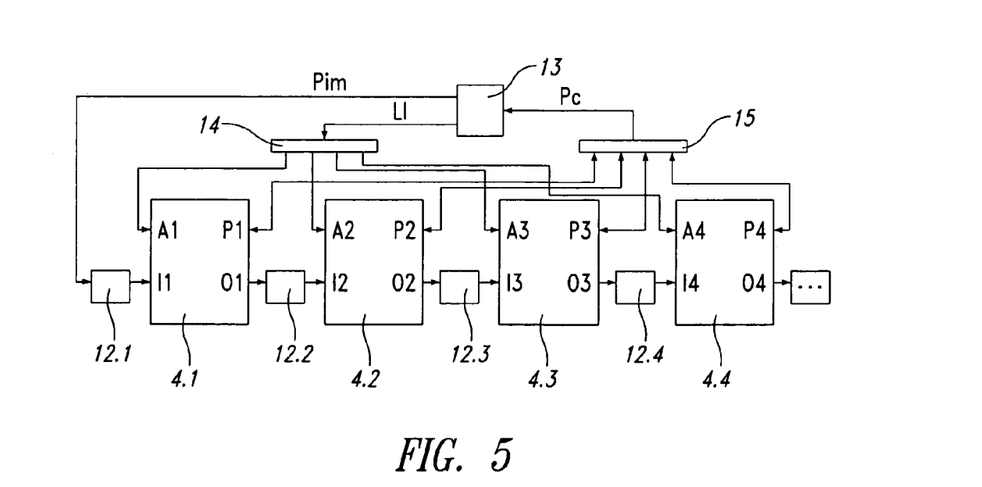
FIG. 5 shows a model of the injection system according to the invention.

Referring in particular to FIGS. 4A, 4B and 5, a system for assessing the pressure inside the fuel accumulating tank, called rail 2, i.e. a virtual sensor for sensing the pressure value inside the rail 2, will be denoted IPS (Intelligent Pressure Sensor) system hereinafter.

As explained here below, the IPS system of this invention optimizes the CR system functioning by estimating the fluid pressure value at the injection points inside the rail 2. Advantageously in this invention, the estimated pressure value is sufficiently accurate, and determines the precise amount of fuel injected into the combustion chamber at a certain opening time of the injector to fill a certain demand for torque.

It should be noted that, as already discussed in connection with the prior art and FIG. 3, the actual pressure signal (curve B) inside the rail shows deep fluctuations related to single injections (curve C).

In particular, the largest difference between the actual pressure signal (curve B) and a preset value (curve A), such as that used in commercially available systems, occurs through most of the main phase (MAIN) and throughout all the POST and AFTER phases.

To suppress these periods of discrepancy in the pressure values used for controlling the CR system, and therefore, to avoid errors in the amount of fuel being injected into the chamber during such periods, advantageously in this invention, the CR system uses the IPS system to anticipate the actual pressure inside the rail 2.

It is important to specify that, to detect the pressure pattern within the rail 2, using a dynamic sensor with a dynamic range that can track sudden pressure variations as may actually occur at the detection point (curve B), e.g. a laboratory sensor, is unthinkable, because of the extremely high cost that would be involved (a cost that would rise to unreasonably high levels in the event of several dynamic sensors being used in the proximities of all the injectors).

Figure 6:
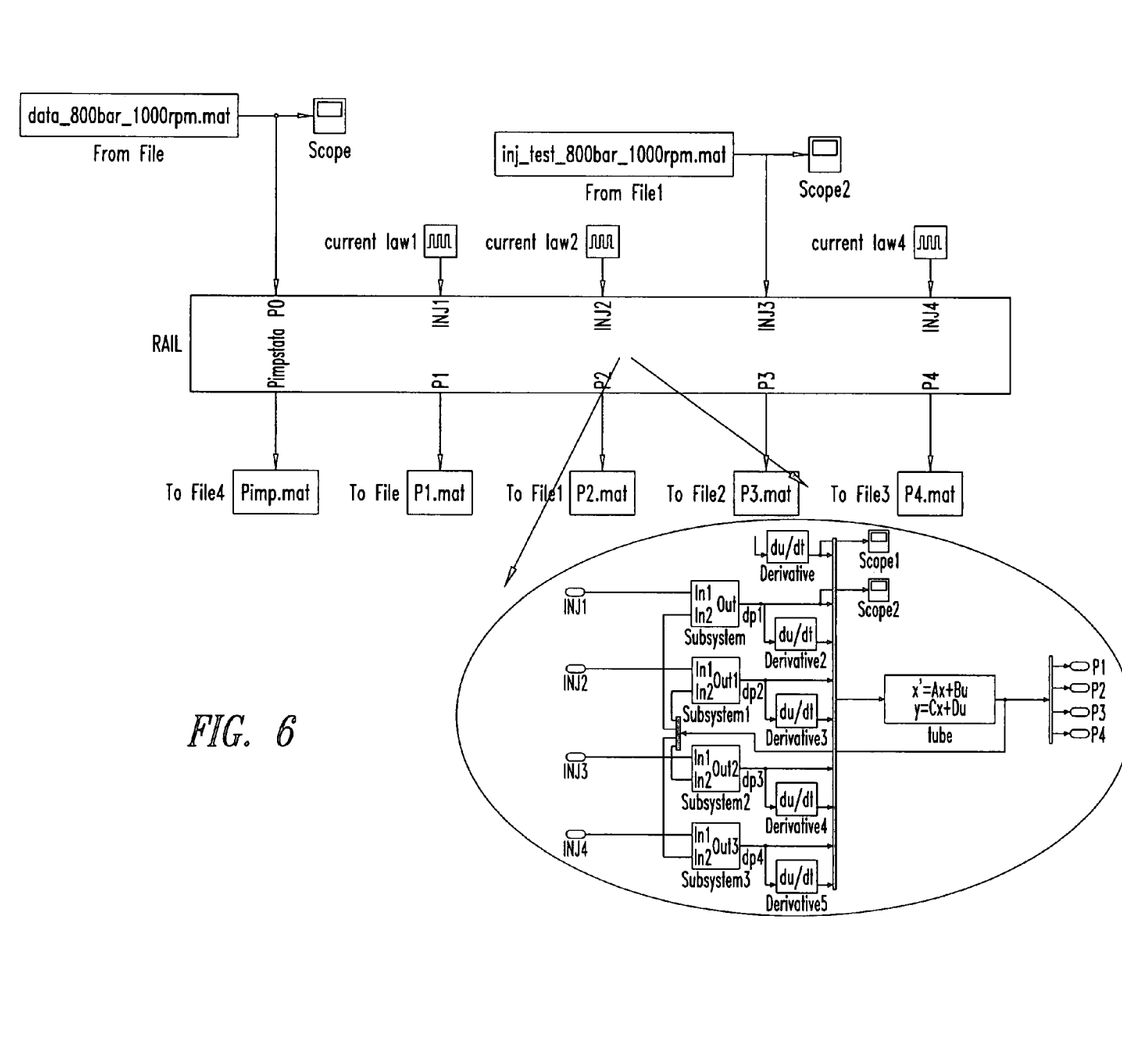
FIG. 6 shows a fluid-dynamic model of the injection system rail according to the invention.

Advantageously in this invention, the IPS system uses a fluid-dynamic model of the rail 2, as shown schematically in FIG. 6, to mathematically work out the pressure value at different points suitably scattered along the rail 2 (at the locations of the injectors 4) as a function of the pressure value and of the injection law set in the electronic unit 9.

Advantageously in this invention, the electronic unit 9 drives the solenoids of the injectors 4 according to the estimated fluid pressure values, obtained from the fluid-dynamic model of the rail 2.

Shown in FIG. 4A is a conventional CR system, with which the IPS system of the invention is used.

In particular, as shown schematically in FIG. 4B, the rail 2 is schematized by a plurality of sub-systems that are in fluid communication, individually modeled, and inputting a fuel flow.

Advantageously in this invention, the representation of the rail 2 comprises a model 12 of the rail sections 2 corresponding to the injectors 4, and allows the pressure value to be calculated at each injector 4 in a dynamic mode, while the engine 1 is running.

To make the operation of the IPS system of the invention better understood, reference will now be made to the functional diagram of such a device shown in FIG. 5.

In this diagram, a plurality of injectors 4.1, . . . , 4.4 are cascade connected together by means of a plurality of blocks 12.1, . . . , 12.5.

In particular, each injector 4 has a first input terminal I, a first output terminal O, a second input terminal A, and a second output terminal P, the latter arranged to supply a pressure value. The first output terminal O1 of the first injector 4.1 is connected to the first input terminal I1 of the second injector 4.2, and so on through the cascade. The first input terminal I1 of the first injector 4.1 is connected to a bus 13 interfacing to the ECU electronic unit 9.

In particular, FIG. 5 is a scheme of a physical system through a computer system, so that the connections shown are logic connections and the signals received on the different terminals represent:

terminal A: the current injection law;

terminal I: the signal of pressure at the injection points being input into the blocks 4.1, . . . , 4.4.

The injectors 4 are controlled by electric signals provided to the second input terminals A and coming from a demultiplexer 14, the latter connected in turn to the bus 13.

The second output terminals P deliver pressure signals to a multiplexer 15, the latter connected in turn to the bus 13.

In this way, the IPS system acquires a signal Pim from the ECU electronic unit 9 corresponding to the pressure set in the rail 2 and the injection law LI, and processes the acquired data according to the fluid-dynamic pressure model to deliver a signal Pc to the ECU electronic unit 9 corresponding to an anticipation of the actual pressure in the rail 2 at the injection points.

The bus 13 is a bi-directional block allowing the ECU electronic unit 9 to communicate with the remainder of the IPS system.

The value Pim of the pressure set in the ECU electronic unit 9 is input into the block 12.1, and hence to the chain of injectors 4.

The injection law LI is transmitted directly to the injectors 4 by the demultiplexer 14.

It should be noted that the block 12.1 models a first section of the rail 2, from a fuel input 16 to the first injector 4.1. It processes the input signal Pim (set pressure) according to a fluid-dynamic model, and delivers a pressure signal to the injector 4.1. The latter represents a model of the rail section comprising the injector 4.1, processes the input signals, and returns the actual pressure value Pc, calculated at the corresponding injection point, to the multiplexer 15.

This calculated actual pressure Pc is also input to the next block 12.2. This is repeated modularly for each injector-block pair.

In summary, the IPS system operates essentially through three phases:

1. it acquires the pressure set in the rail 2 and the injection law from the ECU electronic-unit 9;

2. it processes the acquired data according to a dynamic pressure model;

3. it provides the ECU electronic unit 9 with an anticipation of the actual pressure at the injection points.

In this way, the current law of each injector can be re-calibrated by using the "dynamic" pressure value as calculated from the model of FIG. 5, thereby regulating the amount of fuel injected by the injectors 4 during the CR system operation.

FIG. 6 illustrates schematically how an estimate of the pressure at the injection points can be obtained from the model of the rail 2.

In particular, the variation in the rail pressure value can be modeled by using the following fluid-dynamic equation:

$$\frac{\partial^2 P}{\partial t^2} = c^2 \cdot \frac{\partial^2 P}{\partial x^2} + \frac{4}{3}\frac{\eta}{\rho} \cdot \frac{\partial^3 P}{\partial x^2 \partial t}$$

where:

P is the pressure in the rail 2;

$\eta$ is a dynamic viscosity parameter for the fuel in the rail 2; and $\rho$ is the fuel density.

Figure 7:
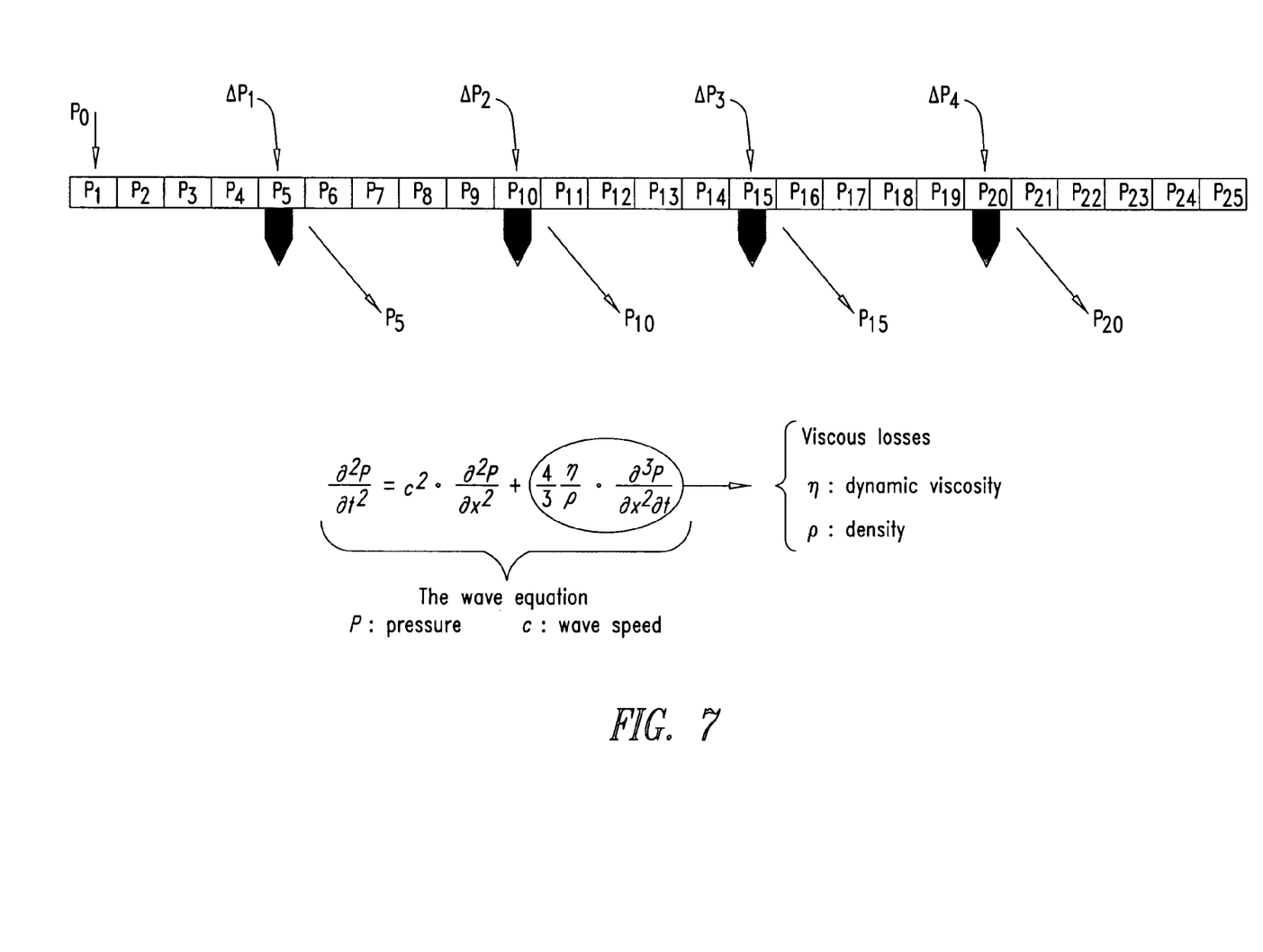

The above wave equation, describing the propagation of a pressure wave through a pipe, has been solved for finite differences with appropriate background conditions, as shown schematically in FIG. 7.

In particular, a model of the rail 2 divided into 25 sections has been considered, and after constructing the input-state-output matrix ABCD, the system of FIG. 6 has been implemented in a simulink simulation system.

This system includes another four subsystems modeling four injectors. The system inputs are the set pressure and the injection law, while the corresponding outputs reproduce the anticipated pressure values at the injection points.

Figure 8:
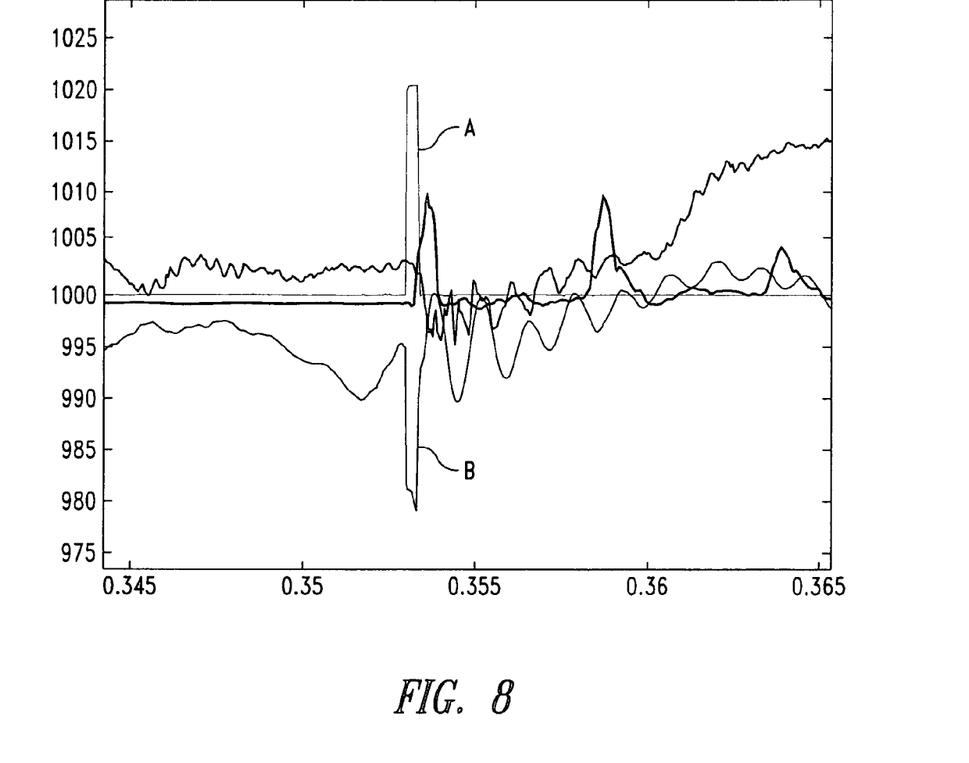
FIG. 8 shows the result of simulations carried out using the virtual pressure sensor of this invention.

In FIG. 8, a comparison is made between the pressure estimated by the IPS system of the invention (curve A) and the pressure actually measured at an injector (curve B).

Advantageously in this invention, the IPS system may be hardware implemented or, equivalently, software implemented by using an algorithm that is written into a memory of the ECU electronic unit 9.

Since the IPS system delivers a rail pressure value dynamically, the information may also be exploited for on-line control purposes.

Actually, on acquiring the signal, a unit could close the control loop by dynamically adjusting the injector opening time.

Assuming a pressure regulator for the rail 2 having a sufficiently short actuation time, the pressure signal from the IPS system could be used for dynamically reloading the rail 2 in anticipation of the pressure decreasement itself, as is the case with injection, and more broadly for attenuating the fluctuations in the rail pressure values. This would enable the CR system to operate under closer conditions to the ideal ones, i.e. at constant pressure in the rail 2.

Finally, an appropriate injection time, at a known pressure, introduces the right amount of fuel into the combustion chamber for attaining perfect combustion. Under this condition, the engine efficiency is enhanced and the emissions of nitrogen oxides, carbon oxides, and unburnt hydrocarbons are reduced.

Figure 9:
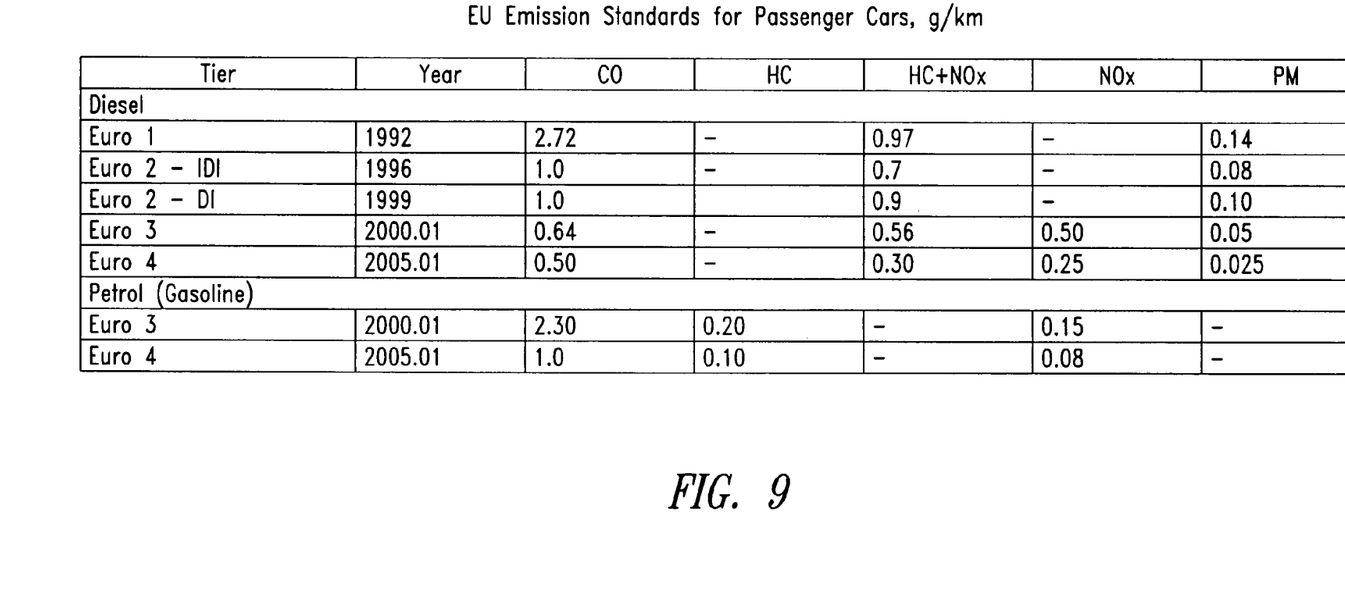
FIG. 9 reports international regulations concerning diesel and gasoline engine emissions for light and heavy vehicles.

Thus, emission regulations Euro IV, set within 2005 (as shown in FIG. 9) can be complied with.

In particular, FIG. 9 shows a group of regulations set by the European Union on the matter of diesel and gasoline engine emissions for light and heavy vehicles.

To summarize, the IPS system can anticipate the pressure value inside the rail at crucial points, i.e. at the injectors, in order to provide the electronic unit (ECU) of the common rail system with more accurate background conditions for selecting the most suitable injection law.

This IPS system is useful to optimize the multiple injection system, currently studied for future application to Common Rail engines, able to reduce consumption and harmful emissions; this new system, if compared to the injection systems currently used in engines equipped with Common Rail injection systems, advantageously adheres to the pressure fluctuations inside the rail. The same injections cause pressure fluctuations, and the phenomenon is even more evident in multiple injection systems where the injections occur more closely in time.

The IPS system described is modular and very general. It is of simple software and hardware Implementation, and it forms a real distributed sensor of pressure, that not only detects punctual data, but also provides information about the pressure value at different points in the rail. Furthermore, it is a cost-efficient system because neither additional physical sensors nor mechanical alteration of the system are needed.

Advantageously in this invention, the IPS system supports a common rail injection system to achieve such objectives as lower consumption, reduced exhaust emissions, and enhanced efficiency of the endothermic engine associated to said injection system.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A virtual pressure sensor for a Common Rail injection system of an endothermic engine, the injection system having at least one fuel pressure accumulating tank, of the rail type, having an input in fluid communication with a high-pressure pump and a plurality of outputs for feeding corresponding injectors, the sensor comprising a pressure regulating means connected to an electronic control unit that estimates fluid pressure in the accumulating tank and generates fluid pressure values, the pressure regulating means obtains the fluid pressure values and an injection law used by said electronic control unit and processes the fluid pressure values and injection law in accordance with a fluid-dynamic model to drive the injectors of said Common Rail injection system and generate an estimated actual pressure value signal to the electronic control unit.

2. The virtual pressure sensor of claim 1 wherein the fluid-dynamic model of said accumulating tank provides models of sections of said accumulating tank and sections corresponding to said injectors and generates the estimated actual pressure signal in accordance with the following equation:

$$\frac{\partial^2 P}{\partial t^2} = c^2 \cdot \frac{\partial^2 P}{\partial x^2} + \frac{4}{3}\frac{\eta}{\rho} \cdot \frac{\partial^3 P}{\partial x^2 \partial t}$$

where:
P is the pressure in the rail 2;
η is a dynamic viscosity parameter for the fuel in the rail 2; and
ρ is the fuel density.

3. The virtual pressure sensor of claim 1 wherein said fluid-dynamic model of said accumulating tank enables the electronic control unit to calculate the fluid pressure value at each injector dynamically, while said endothermic engine is running.

4. The virtual pressure sensor of claim 1 wherein through the fluid-dynamic model, said accumulating tank is schematized in the pressure regulating means by a cascade of subsystems in fluid communication with one another, each subsystem comprises a first input terminal and first output terminal, as well as a second input terminal connected to said electronic control unit and a second output terminal arranged to supply a pressure value.

5. The virtual pressure sensor of claim 4 wherein said first input terminal of a first subsystem of said cascade of subsystems is connected to a bus interfacing to said electronic control unit.

6. The virtual pressure sensor of claim 5 wherein said second input terminals of said subsystems are connected to a demultiplexer, the latter connected in turn to said interfacing bus.

7. The virtual pressure sensor of claim 5 wherein said second output terminals of said subsystems are connected to a multiplexer, the latter connected in turn to said interfacing bus.

8. The virtual pressure sensor of claim 5 wherein said electronic control unit supplies said interfacing bus with a signal corresponding to the fluid pressure value set by the accumulating tank and an injection law, and receives from it the signal corresponding to the estimation of the actual pressure in said accumulating tank at said injectors, as estimated by said fluid-dynamic model.

9. A common rail injection system for an endothermic engine, the injection system comprising:
at least one fuel pressure accumulating tank coupled to at least one injector;
a pressure regulating means coupled to an electronic control unit and to each at least one injector, the pressure regulating means receiving an injection law and a pressure signal from the electronic control unit corresponding to estimated fluid pressure values in the accumulating tank and generating therefrom an estimated actual pressure signal in accordance with a fluid-dynamic model that is transmitted to the electronic control unit for driving the at least one injector.

10. The system of claim 9, further comprising an interface bus coupling the electronic control unit to the at least one injector, the electronic control unit configured to supply the interfacing bus with a signal corresponding to a pressure set by the accumulating tank and the injection law, and to receive from the interfacing bus the estimated actual pressure signal corresponding to an estimation of the actual pressure in the accumulating tank at the injectors as generated in accordance with the fluid-dynamic model.

11. The system of claim 10 wherein the fluid-dynamic model of the pressure regulating means uses the following equation to calculate the estimated actual pressure value of each injector while the endothermic engine is running:

$$\frac{\partial^2 P}{\partial t^2} = c^2 \cdot \frac{\partial^2 P}{\partial x^2} + \frac{4}{3}\frac{\eta}{\rho} \cdot \frac{\partial^3 P}{\partial x^2 \partial t}$$

where:
- P is the pressure in the rail 2;
- η is a dynamic viscosity parameter for the fuel in the rail 2; and
- ρ is the fuel density.

12. A pressure regulating system for a common rail fuel injection system of an endothermic engine having at least one fuel pressure accumulating tank of the rail type coupled to a plurality of injectors, the accumulating tank having an input in fluid communication with a high-pressure fuel pump and a plurality of outputs for feeding fuel to the corresponding injectors, the pressure regulating system comprising:
  an electronic control unit;
  an interface coupled to the electronic control unit; and
  a plurality of pressure regulators, each pressure regulator coupled to the interface and to a respective injector, the pressure regulator configured with a fluid-dynamic model of the accumulating tank that receives from the electronic control unit an injection law and dynamic fluid pressure values that are transmitted via the interface bus and that generates therefrom an estimated actual pressure valve to the electronic control unit via the interface bus for driving the plurality of injectors.

13. The system of claim 12 wherein the electronic control unit is configured to supply the interfacing bus with a signal corresponding to the dynamic pressure set by the accumulating tank and the injection law, and to receive from the interfacing bus the estimated actual pressure signal.

14. The system of claim 13 wherein each injector is in fluid communication with other injectors and comprises a first input terminal and a first output terminal, a second input terminal coupled to the electronic control unit and a second output terminal configured to supply a pressure value to the interface bus.

15. A pressure regulating system for a common rail fuel injection system of an endothermic engine having at least one fuel pressure accumulating tank of the rail type and a plurality of injectors coupled to the accumulating tank for receiving fuel therefrom, the pressure regulating system comprising:
  an electronic control unit;
  an interface bus coupled to the electronic control unit for bi-directional communication;
  a plurality of pressure regulators, each pressure regulator coupled to a respective fuel injector, each fuel injector except a first fuel injector in fluid communication with other injectors, and each fuel injector coupled to the interface bus and configured to generate a pressure estimation signal on a first output that is transmitted to the interface bus for use by the electronic control unit in driving the injectors, a first input terminal coupled to the interface bus for receiving an injection law from the electronic control unit, a second input terminal configured to receive a signal from a preceding fuel injector except the first fuel injector, and a second output terminal coupled to a succeeding fuel injector and configured to deliver pressure signals to the succeeding fuel injector except for the last fuel injector;
  the interfacing bus having an output coupled to the second input terminal of the first fuel injector to receive an actual pressure signal from the electronic control unit through the interface bus that is calculated from an estimated fuel pressure in the accumulating tank and the injection law in accordance with a fluid-dynamic model by operation of the following equation:

$$\frac{\partial^2 P}{\partial t^2} = c^2 \cdot \frac{\partial^2 P}{\partial x^2} + \frac{4}{3}\frac{\eta}{\rho} \cdot \frac{\partial^3 P}{\partial x^2 \partial t}$$

where:
- P is the pressure in the rail 2;
- η is a dynamic viscosity parameter for the fuel in the rail 2; and
- ρ is the fuel density.

16. The system of claim 15 wherein the first input of each pressure injector is coupled to the interfacing bus via a demultiplexer.

17. The system of claim 15 wherein the first output of each injector pressure regulator is coupled to the interfacing bus via a multiplexer.

18. The system of claim 15 wherein the fluid dynamic model of the accumulating tank is configured to generate models of sections of the accumulating tank and sections corresponding to each of the plurality of injectors.

19. The system of claim 15 wherein the fluid-dynamic model of the accumulating tank is configured to enable the electronic control unit to calculate the pressure value of each injector dynamically while the endothermic engine is running.

* * * * *